No. 764,713. Patented July 12, 1904.

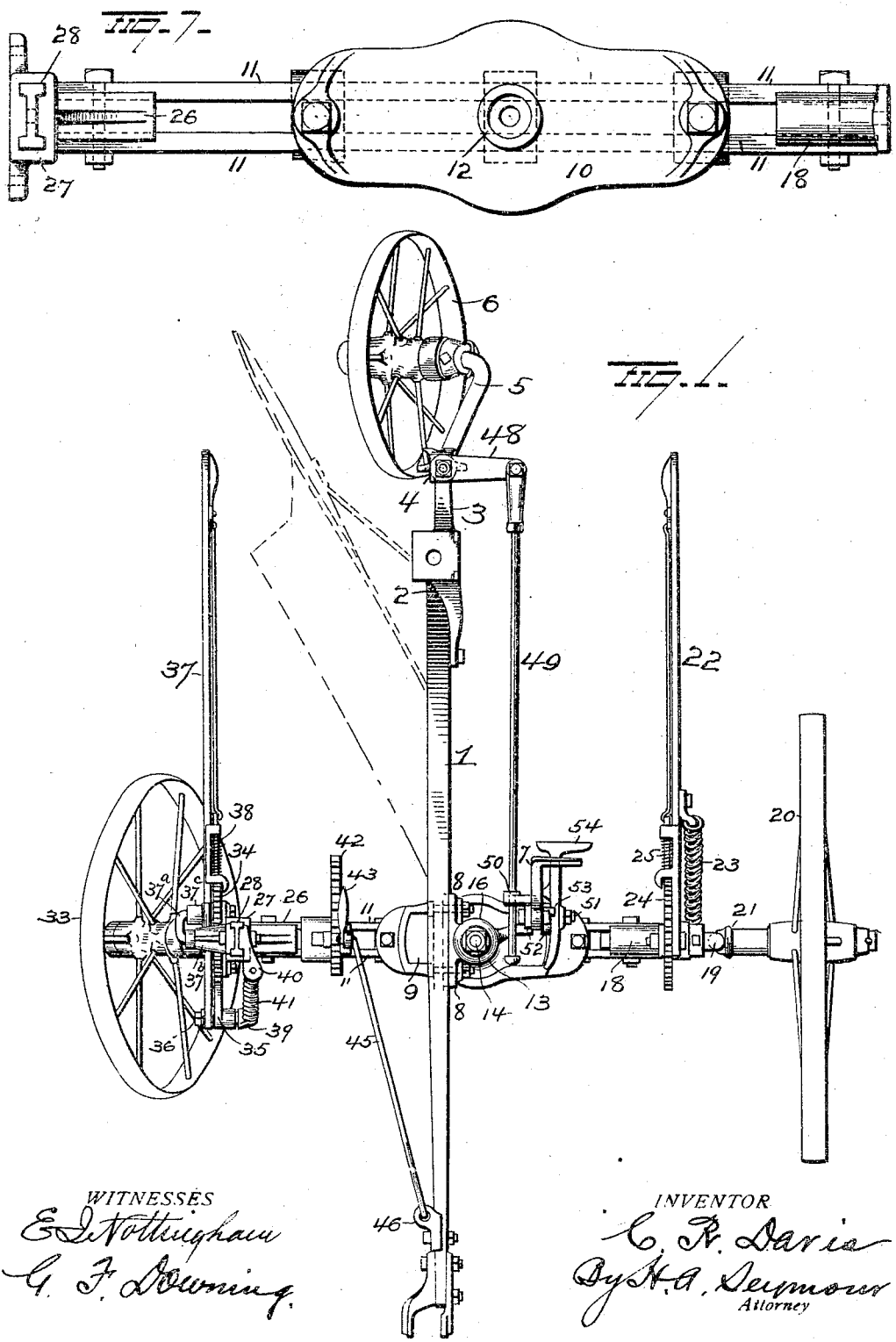

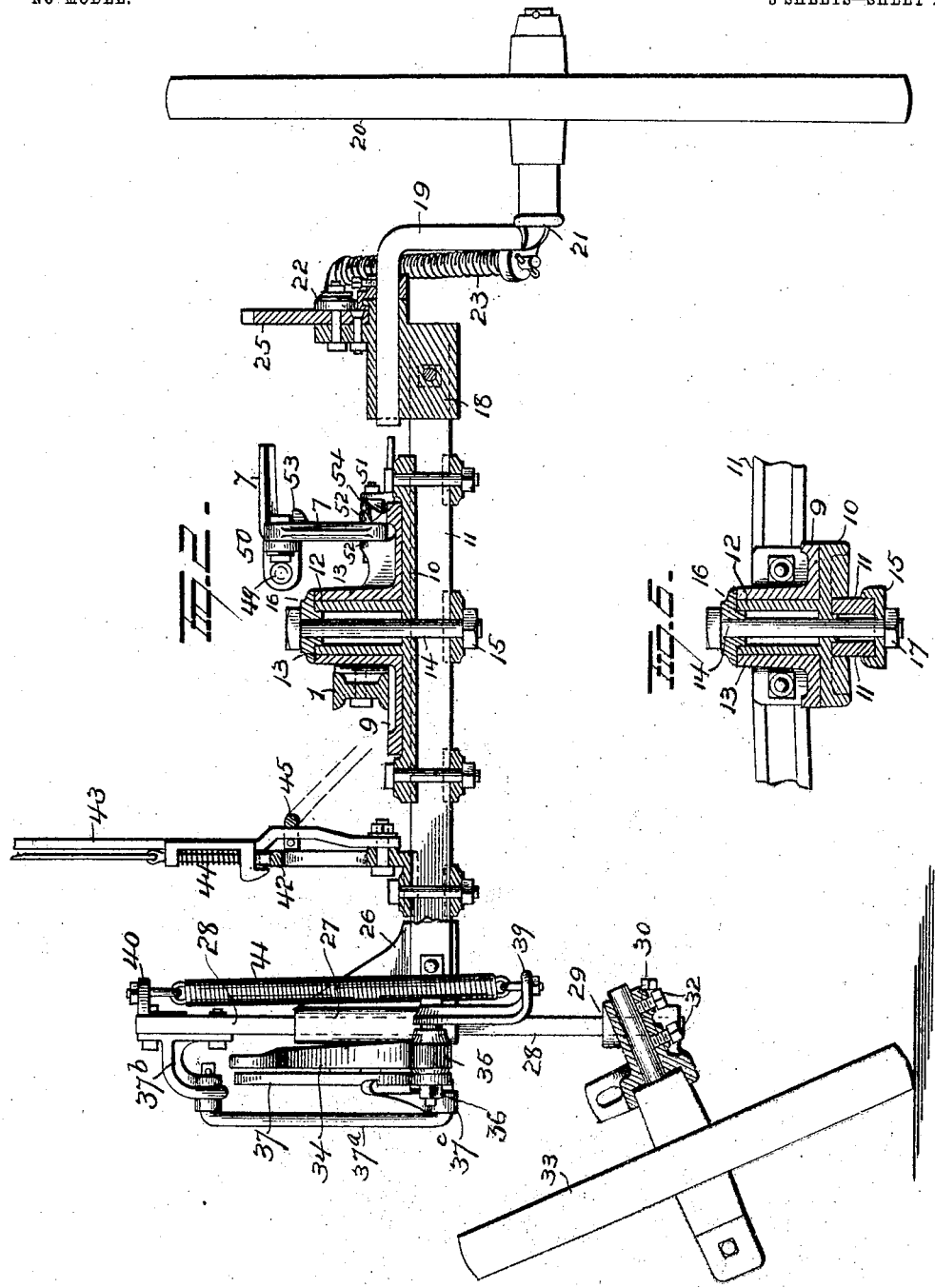

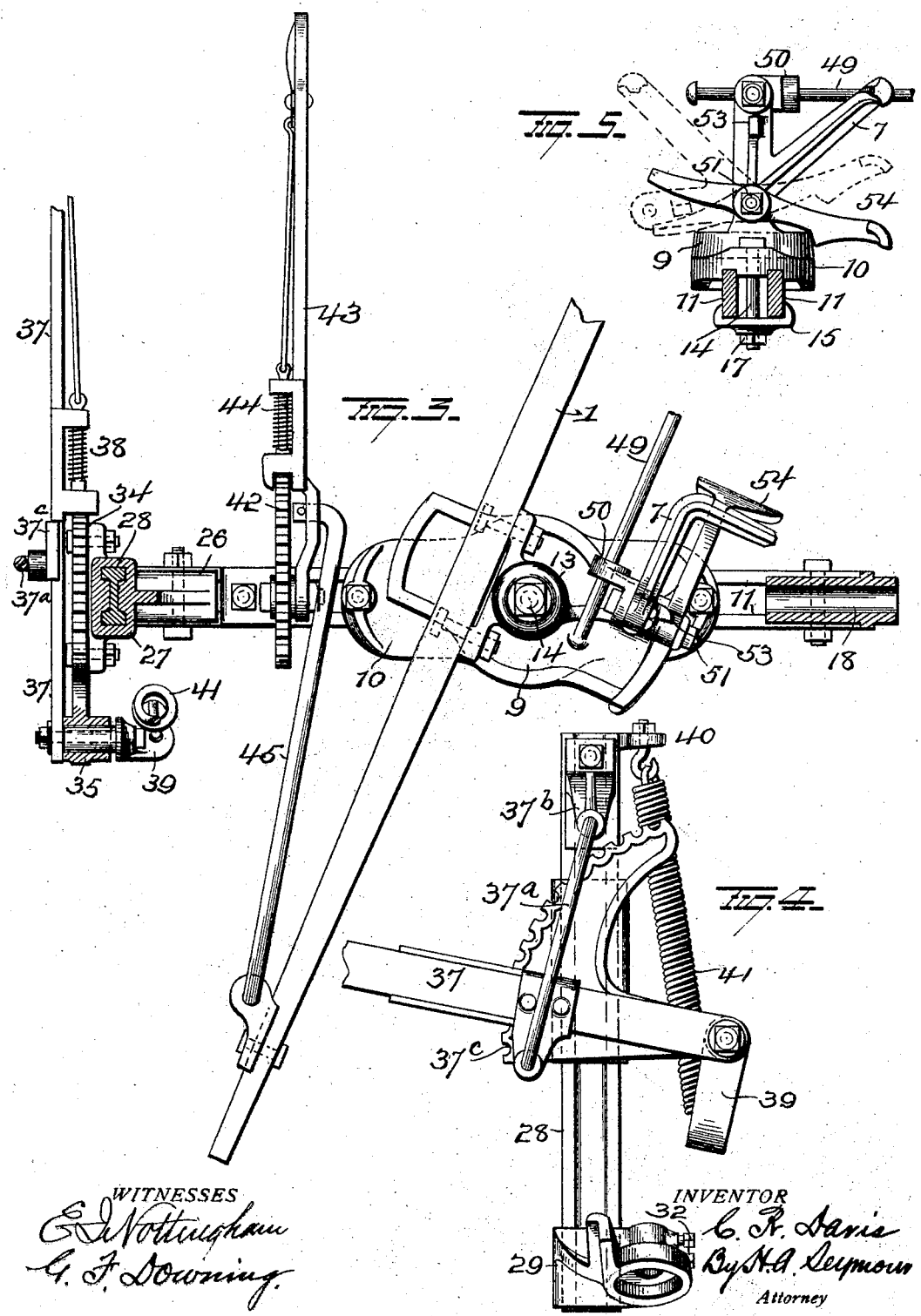

UNITED STATES PATENT OFFICE.

CALVIN R. DAVIS, OF SOUTH BEND, INDIANA, ASSIGNOR TO OLIVER CHILLED PLOW WORKS, OF SOUTH BEND, INDIANA.

PLOW.

SPECIFICATION forming part of Letters Patent No. 764,713, dated July 12, 1904.

Application filed November 4, 1903. Serial No. 179,839. (No model.)

*To all whom it may concern:*

Be it known that I, CALVIN R. DAVIS, a resident of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

My invention relates to an improvement in plows, and more particularly to sulky-plows, the object of the invention being to provide improved pivotal mounting of the cross-frame (carrying the land and furrow wheels) with the plow-beam and provide means under the control of the operator for moving the land and furrow wheels at any desired angle to insure the plowing of a straight furrow, especially in hillside work.

With this object in view the invention consists in certain novel features of construction and combinations and arrangements of parts, as will be more fully hereinafter described, and pointed out in the claims.

In the accompanying drawings, Figure 1 is a plan view. Fig. 2 is a transverse sectional view. Fig. 3 is an enlarged detail plan view. Figs. 4, 5, 6, and 7 are enlarged views illustrating various other details of construction.

1 represents the metal plow-beam, bent at its rear end, forming a standard 2, to which a suitable moldboard and plow-point are secured, and to the upper curved portion of the standard a bracket 3 is securely bolted and provides a vertical sleeve 4, in which a crank-shaft 5 is mounted, and carries the rear caster or follower-wheel 6, controlled by a foot-lever 7, to be hereinafter described.

The beam 1 about midway its ends is securely bolted to lugs 8 on a cast-metal plate 9, supported on a larger plate 10, rigidly secured to a cross-frame 11, comprising parallel bars. The lower plate 10 has an integral hollow journal or hub 12 projecting upward from its center into a similarly-shaped box or hub 13, integral with upper plate 9. A bolt 14, passed through a cross-bar 15 below frame 11, extends up between the bars of said frame through hollow journal 12 and has a large washer 16 thereon, forming a cover for journal-box 13, and a nut 17 is screwed onto the lower end of the bolt 14, securing the parts together, but permits free rotary movement of the journal 12 in box 13.

Between the bars forming cross-frame 11 at one end a casting 18 is secured and is made with a sleeve to receive a crank-shaft 19, on which the land-wheel 20 is mounted, and a bracket-casting 21 is secured to the wheel-journal portion of this shaft 19 and is connected with a lever 22 by a spring-inclosed rod 23, said lever being pivoted to a toothed segment 24 on casting 18 and made with a spring-pressed detent 25 to lock the lever in any position. It will be observed that by manipulating lever 22 the crank-shaft 19 can be turned in either direction to raise or lower this side of the frame and plow. Between the bars of frame 11, at its opposite end, a casting 26 is secured and is made with a vertical bearing 27, suitably cored to fit a bar 28, I shape in cross-section. To the lower end of this bar 28 a casting 29 is adjustably secured by set-screws 30, cored to receive a furrow-wheel-axle stub secured in place by set-screws 32 and having a furrow-wheel 33 mounted thereon, said furrow-wheel being preferably smaller than the land-wheel, as shown. A toothed segment 34 is secured to casting 26 and is made with a forwardly-projecting arm 35, having a bearing at its forward end for a bolt 36, on which a lever 37 is fulcrumed, and provided with a spring-pressed detent 38 to lock with segment 34. A rod-link 37ª connects a bracket 37ᵇ on bar 28 with a similar bracket 37ᶜ on lever 37, thus compelling the bar 28 to move vertically in the bearing 27 when the lever 37 is operated. A small bracket 39 is also secured on bolt 36 and is connected with a similar bracket 40 on the upper end of bar 28 by a lifting-spring 41 to assist lever 37 in raising the bearing 27 and frame 11 on bar 28 and counterbalance the weight in lowering.

On frame 11 near casting 26 a toothed segment 42 is secured and has pivotally connected therewith a lever 43, having a spring-pressed detent 44 to lock with the segment. A rod 45 is pivotally connected at one end to this lever 43 and at its opposite end is pivotally secured by a colter-pin in an eye-bracket 46, fixed to the plow-beam 1 near its forward end. It will thus be seen that the operator may by manipulating the landing-lever 43 change the line of travel of both the furrow and land wheels either to the right or left, as may be required. This is a valuable feature, especially in hillside plowing, as the operator may by this improvement cut an even-width furrow when throwing the soil up or down on the hillside. He is also enabled to straighten a crooked furrow, regulate the width of cut, and turn a square corner at end of furrow.

To the upper end of rear caster-wheel crank-shaft 5, above referred to, an arm 48 is secured, and a rod 49 is pivotally connected to this arm, projects forward through a bracket 50 on a bell-crank foot-lever 7, and has a head or enlargement on its forward end. The foot-lever 7 is fulcrumed on a bolt 51, passed through alined openings in parallel ears 52 on casting-plate 9, and said lever 7 has a lateral lug 53 on its forward member, which when forced forward to lock the caster-wheel in working position will rest upon and depress the forward arm of a releasing foot-lever 54, fulcrumed between its ends on bolt 51, so that when the foot-lever 7 is in its forward position the operator can by pressure on lever 54 release said lever 7 from such position and permit the plow to line to the right. No release is necessary in turning to the left, as the rod 49 is free to move forward in bracket 50.

A great many changes might be made in the general form and arrangement of the several parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a sulky-plow, the combination with a cross-frame provided with bearings for land and furrow wheels, of a frame-plate secured to the cross-frame, a beam-plate mounted upon the frame-plate, a beam secured to the beam-plate, means pivotally connecting said plates, an operating-lever mounted on the cross-frame and a connection between said lever and the plow-beam.

2. In a sulky-plow, the combination with a cross-frame provided with land and furrow wheel bearings, of a plate pivotally connected with said cross-frame, a plow-beam secured to said pivoted plate, a caster-wheel, a connection between said caster-wheel and said pivoted plate, a lever mounted on the cross-frame and a connection between said lever and the plow-beam for turning the beam and pivoted plate to which it is secured.

3. In a sulky-plow, the combination of a cross-frame, a beam, a pivotal connection between said cross-frame and the beam, a caster-wheel supporting the beam at its rear end, of a land-wheel crank-shaft having rotary mounting in one end of the frame, a land-wheel on said shaft, a lever to turn the shaft and raise and lower this end of the frame, means for locking the lever in any position of adjustment, an angular bearing at the other end of the frame, an I-bar mounted to move vertically in said bearing, a furrow-wheel connected with the lower end of said I-bar, and means for raising and lowering the I-bar in the bearing to raise or lower this side of the frame, a lever mounted on the cross-frame and a connection between said lever and the plow-beam.

4. In a sulky-plow, the combination with a cross-frame, land and furrow wheels connected therewith, and a beam supported on said cross-frame, of a bracket at the rear end of the beam, a crank-shaft mounted in a bearing in said bracket, a caster or follower wheel on said shaft, an arm secured on the upper end of the shaft above the bracket, a bell-crank foot-lever fulcrumed on the cross-frame, a bracket on one member of said lever, a rod pivotally connected with said arm, passing through an opening in the foot-lever bracket and headed at its forward end, so that when the foot-lever is pushed forward the follower-wheel will be held in working position, and another foot-lever fulcrumed between its ends on the cross-frame and adapted to engage a lug on the bell-crank foot-lever and release the latter from locking position when said last-mentioned foot-lever is depressed.

5. In a sulky-plow, the combination of a main frame, a cross-frame carrying bearings for land and furrow wheels, a plate pivotally connected with said cross-frame, a beam secured to said plate, a caster-wheel at the rear end of the main frame, a bell-crank foot-lever pivoted to said plate and adapted to lock the caster-wheel in working position, and a second foot-lever also carried by said plate and adapted to release the bell-crank lever from its locked position.

In testimony whereof I have signed this specification in the presence of two subscribing witnesses.

CALVIN R. DAVIS.

Witnesses:
 EDWIN NICAR,
 FRANCIS C. NIPPOLD.